United States Patent [19]
Quinting et al.

[11] 3,806,678
[45] Apr. 23, 1974

[54] REEL SWITCH FOR SAFETY BELTS

[75] Inventors: Rudi Franz Quinting, Clawson; James A. Gavagan, Center Line, both of Mich.

[73] Assignee: Irvin Industries, Inc., Greenwich, Conn.

[22] Filed: Aug. 11, 1972

[21] Appl. No.: 279,837

Related U.S. Application Data

[63] Continuation-in-part of Ser. No. 172,816, Aug. 18, 1971, abandoned.

[52] U.S. Cl. ...... 200/61.58 B, 200/52 R, 200/153 P, 242/107 SB
[51] Int. Cl. ............................................. H01h 3/16
[58] Field of Search ........... 200/52 R, 61.15, 61.16, 200/61.17, 61.58 B, 6 BB, 38 R, 38 C, 38 B, 61.58 R, 153 P, 153 PA; 242/107 SB, 107.5

[56] References Cited
UNITED STATES PATENTS

| | | |
|---|---|---|
| 3,423,555 | 1/1969 | Preux ........................ 200/153 P UX |
| 3,308,902 | 3/1967 | Carter ...................... 200/61.58 B UX |
| 3,632,059 | 1/1972 | Loose ........................ 200/61.58 B X |
| 3,689,881 | 9/1972 | Hayashi ..................... 200/61.58 B X |
| 2,795,658 | 6/1957 | Ward ............................... 200/6 BB |
| 2,711,448 | 6/1955 | Shewmon et al. ............... 200/6 BB |
| 3,553,720 | 1/1971 | Brown ............................. 200/38 R |

*Primary Examiner*—James R. Scott
*Attorney, Agent, or Firm*—Ryder, McAulay, Fields, Fisher & Goldstein

[57] ABSTRACT

An indicator signal control switch for use with safety belt retractors is disclosed. The switch includes a crank drivingly associated with the retractor spool and being rotated by protraction and retraction of the safety belt. The crank moves a driven means to which an indicator signal means is responsive after the driven means moves a predetermined distance corresponding to a desired extent of protraction of the safety belt.

4 Claims, 10 Drawing Figures

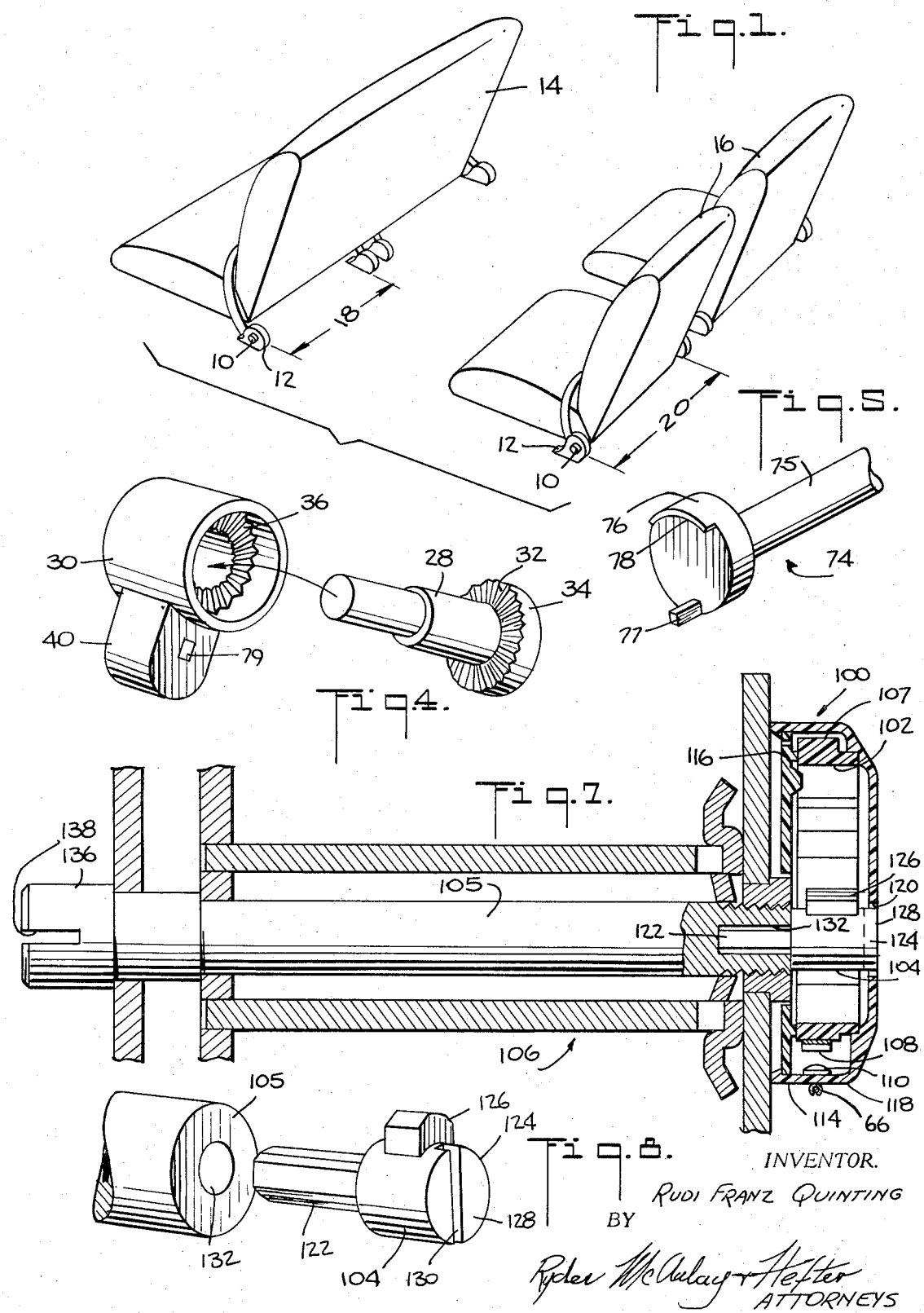

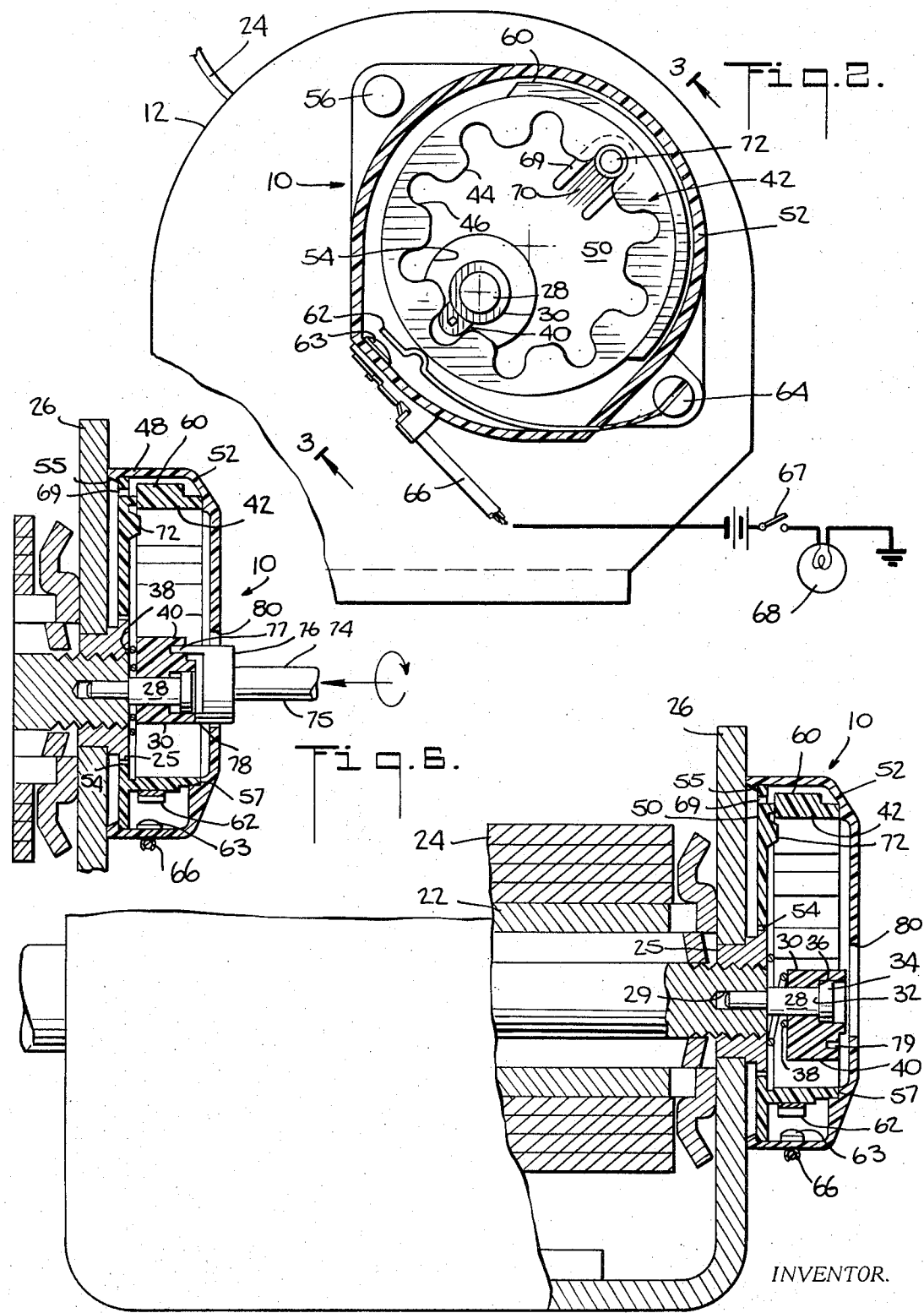

REEL SWITCH FOR SAFETY BELTS

This is a continuation-in-part of patent application, Ser. No. 172,816 filed Aug. 18, 1971 now abandoned.

This invention relates to safety belt retractors and, more particularly, to a switch for use with such retractors in order to provide an indication that the safety belt has or has not been protracted a predetermined distance.

The effectiveness of seat belts or safety belts in preventing injuries or reducing the extent of injuries during a vehicular accident is well established. Unfortunately, many passengers prefer not to use such belts even though they are mandatory equipment on airplanes and automobiles. In an attempt to encourage and enforce the use of safety belts, it is desirable to provide the vehicle with indicating means to inform the passenger and others present in the vehicle that the safety belt is not being used properly. Indeed, according to U.S. Federal Motor Vehicle Safety Standards all new vehicles will be required to issue a signal if the occupant of either front outboard position has not protracted his lap safety belt a specified length. One way to control the signal is by means of a reel switch is responsive to movement of the safety belt. It is also current practice on airplanes for stewardesses to walk the length of the aisle checking each passenger to be sure that the safety belt is in use. It would be desirable to have a signal system indicating each seat belt which has not been protracted a specified length.

To simplify manufacturing, installation and maintenance of safety belt reel mechanisms such as automatic retractors, it is desirable that the reel switch be an independent adjustable unit operatively connected to the safety belt reel mechanism but capable of being dissociated from the reel mechanism for adjustment, repair or replacement. Because of the difference in seat designs used in different automobiles, the location of a passenger with respect to the safety belt reel mechanism varies thereby requiring different actual protraction lengths to provide the effective minimum standard protraction. By providing a reel switch which can be adjusted independently from the safety belt reel mechanism, a single design for the reel switch may be used in all automobiles with the switch being easily adjusted to be compatible with the particular seat design with which it is used so that the required signal is provided when the seat belt has an effective protraction of the desired amount. With such a switch there is no need to adjust or modify the entire safety belt reel mechanism; only the switch need be adjusted.

BRIEF DESCRIPTION

Briefly stated, this invention in one form comprises a reel switch capable of being mounted for use in combination with an automatic safety belt retractor of conventional design. The safety belt retractor normally includes a rotatably mounted spool to which a safety belt is attached and wrapped such that as a passenger pulls upon the safety belt the belt causes the spool to rotate permitting unwinding of the safety belt from the retractor mechanism.

The switch of this invention includes a shaft adapted to be attached to one end of the retractor spool so that it rotates therewith. Drivingly connected to the switch shaft or formed thereon is a crank having a tooth or lug designed to mate with gear teeth provided on a driven member. The driven member is rotatably mounted contiguous to the crank such that the driven member rotates a predetermined amount with each complete rotation of the crank and spool. An indicator switch spring biased toward the open position is mounted adjacent the outer surface of the driven member and a switch activator is mounted on the outer surface of the driven member. When the automobile ignition is on and the seat belt is in its fully retracted position the activator closes the switch providing a visible or audible signal or both indicating the safety belt is not in use. As the safety belt is protracted, the driven member rotates and, after it rotates a predetermined amount, the activator ceases closing the indicator switch which then opens. The amount of movement required of the driven member before the indicator switch opens corresponds to the required protraction of the safety belt.

If desired adjustment of the switch may be provided without affecting or requiring movement of the safety belt reel mechanism. The crank may be adapted to be operatively disengaged from the spool. When the crank is dissociated from the spool, rotation of the crank can be performed without rotating the safety belt spool. Rotation of the crank causes rotation of the driven member and changes the position of the switch activator with respect to the indicator switch. A retainer is provided to releasably hold the switch activator in position relative to the indicator switch when the crank lug is disengaged from the driven member. The retention device may take the form of a spring biased detent which mates with receptacles in the driven member.

OBJECTIVES AND DESCRIPTION OF DRAWINGS

Accordingly, it is one objective of this invention to provide an improved safety belt reel switch which is easy and inexpensive to manufacture and install.

It is another objective of this invention to provide a switch for safety belt reels which is suitable for installation on existing reels and which can be easily adjusted to vary the point of excitation to make it compatible with the particular mechanism and location of installation.

These and other objectives and attendant advantages of this invention will become apparent and better understood from the detailed description below taken together with the drawings in which FIG. 1 is a perspective illustration of two different types of seats with which the reel switch of this invention may be used.

FIG. 2 is a sectional elevational view illustrating the reel switch of this invention.

FIG. 3 is a sectional view taken along the line 3—3 of FIG. 2.

FIG. 4 is a perspective illustration of a crank and clutch used in one embodiment of the reel switch of FIG. 2.

FIG. 5 is a perspective illustration of a special tool required to adjust the reel switch of FIG. 2.

FIG. 6 is a sectional view of the reel switch of FIG. 2 shown being adjusted.

FIG. 7 is a sectional elevational view of a reel switch formed in accordance with a second embodiment of this invention.

FIG. 8 is a perspective illustration of the crank used in the second embodiment of FIG. 7.

DETAILED DESCRIPTION

First Embodiment

Figure 9:
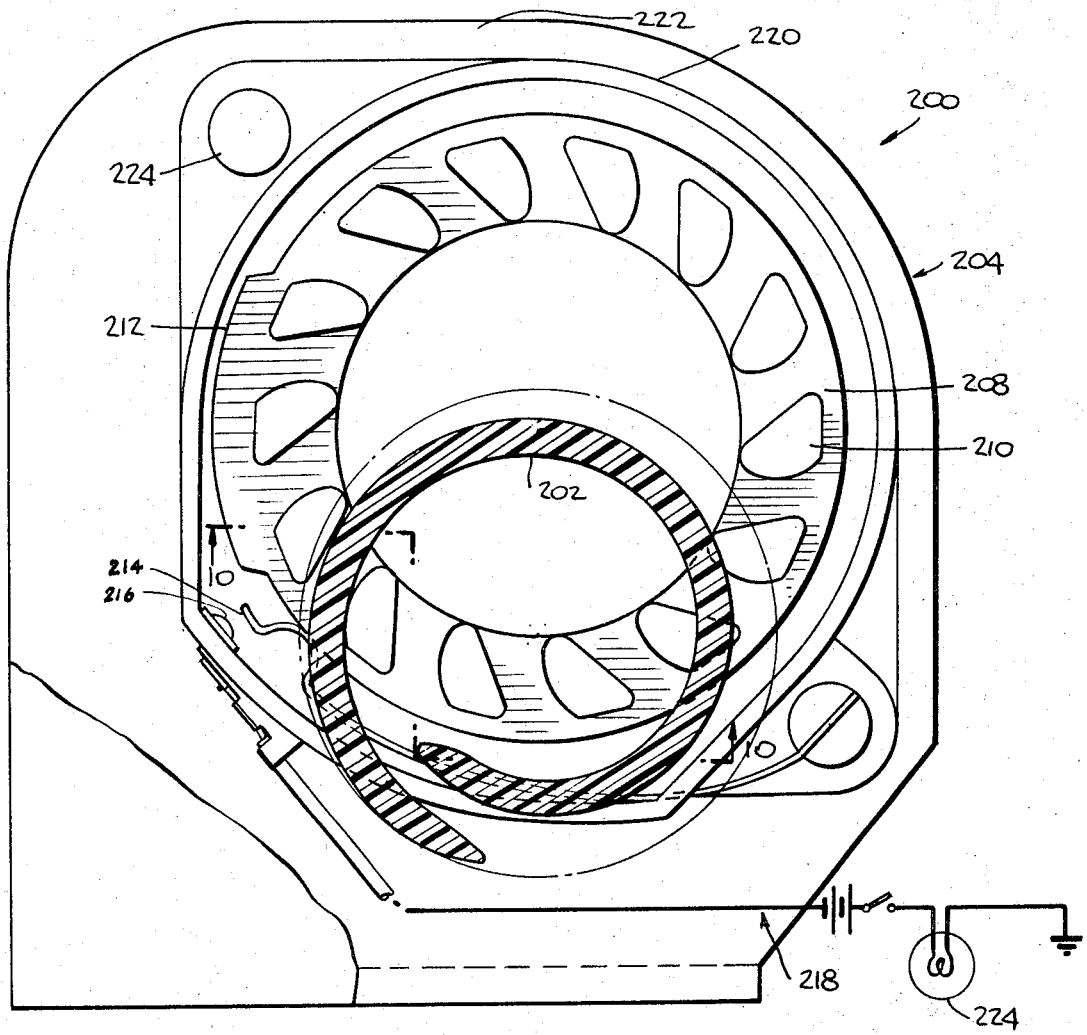
FIG. 9 is a sectional view of a reel switch formed in accordance with a third embodiment of this invention.
Figure 10:
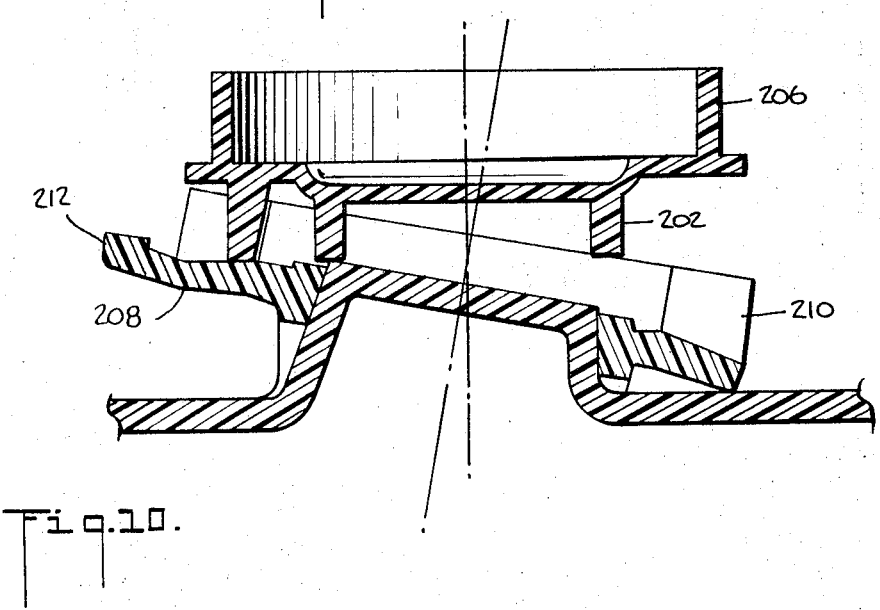
FIG. 10 is a sectional view taken along the line 10—10 of FIG. 9.

With reference to the drawings, and particularly FIGS. 1 - 3, there is illustrated an adjustable switch 10 for use with a conventional safety belt reel mechanism 12, such as an automatic retractor. While the mechanism may be used on various types of vehicles, such as airplanes, boats, etc. for discussion purposes the following will be directed only to use in an automobile. FIG. 1 illustrates two different types of automobile seats, namely a conventional bench seat 14 and conventional bucket seats 16, each being supplied with automatic safety belt retractors 12. Because of the location of the retractors 12 with respect to the seating surface of the seats 14, 16 and because of the spacing between the buckle and clasp ends of the safety belt, the spacing being indicated as 18 for the bench seat 14 and 20 for the bucket seat 16, the extent of protraction of the safety belt to fit around the same person sitting on each seat is different. However, according to U.S. government standards each automobile in the future is to be provided with an indicator, both visible and audible, which remains on if the ignition is on and the occupant of either front outboard position on the seat has not extended his lap safety belt a specified length. The adjustable switch 10 of this invention permits rapid and easy adjustment of the deenergization point of the indicator to account for the variances between the different types of seats with which the switch is to be used and without requiring modification or variation of the automatic seat belt retractor 12.

The retractor 12, which does not form a part of this invention but with which the switch of this invention is used, may be of the conventional type which utilize a reel or spool 22 about which the safety belt 24 is wound and to which the end of the safety belt is firmly attached. The spool 22 is rotatably supported within bushings 25 mounted in the retractor housing 26.

The adjustable switch 10 which forms the first embodiment of this invention is designed to require the use of a special tool to adjust the switch in order to discourage the automobile owner or service station attendant from adjusting the switch so that the warning signal does not comply with government standards. This switch 10 is intended to be set initially by the manufacturer or dealer and left in that position.

The reel switch 10 includes a shaft 28 coaxial with and fixedly attached to the spool 22 by any conventional means such as force fitting the shaft into a cylindrical recess 29 in one end of the spool 22. A driving means, such as a crank 30 is mounted for free rotation about the shaft 28 and is drivingly connected to the shaft by a clutch. One type of suitable clutch is a serrated surface on the inwardly directed face 32 of a flanged head 34 formed on one end of the shaft 28 which mates with a serrated surface on the outwardly directed face 36 of the crank 30 (see detail, FIG. 4). Biasing means, such as spring 38 is placed between the crank 30 and the bushing 25 and normally biases the crank into position where the serrated surfaces interdigitate drivingly connecting the shaft 28 and crank 30.

In addition to the clutch, the crank 30 also is provided with a driving arm or lug 40 on its outer periphery to drivingly engage an internal gear controller 42. The controller 42 is rotatably mounted eccentrically with respect to the crank 30 and has a plurality of gear teeth 44 formed on its inner periphery, the gear teeth defining receiptacles 46 to receive the driving arm 40 of the crank 30. The axis of the controller 42 is offset with respect to the axis of the crank 30 in a typical internal gear-pinion arrangement as can be seen in FIG. 2. The particular design illustrated in FIG. 2 provides a ten-to-one gear ratio whereby the controller 42 rotates 36° for each 360° rotation of the crank 30.

The controller 42, crank 30 and shaft 28 are enclosed within a housing 48 formed from two parts, a rear wall 50 and a cover 52. An aperture 54 extends through the rear wall to receive an extending portion of the bushing 25. The cover 52 snaps on to the rear wall 50 by means of a plurality of spaced inwardly extending flanges 55 and is firmly attached to the retractor housing 26 by any suitable means such as rivets 56. An annular recess 57 is formed in the inner surface of the cover to slidably receive and support the controller for rotary motion. The cover and rear wall are molded from a plastic having a low coefficient of friction such as polyoxymethylene polymer (for example, Delrin by E.I. DuPont de Nemours & Co.).

An activator 60 in the form of a cam surface is formed about a portion of the outer surface of the controller 42. Also mounted within the housing 48 is an indicator actuation means, specifically a pair of contacts 62, 63. One of the contacts 62 is electrically connected to the automobile chassis which serves as the ground, the connection being made through the grounding screw 64 and retractor housing 26. The other contact 63 leads to the indicator by means of a conductor 66. The contact 62 which can be a stamped phosphor-bronze spring tempered breaker blade is shaped to be biases toward an open position as shown in FIG. 2. When the safety belt is fully retracted the controller 42 is positioned so that the activator 60 forces the contact 62 to touch contact 63. The indicator signal circuit will be completed upon closing the ignition switch 67 setting off the indicating signal shown as a light 68. Assuming that protraction of the safety belt causes the spool 22 to rotate counterclockwise in FIG. 2, the crank 30 similarly will rotate counterclockwise causing the controller 42 to rotate counterclockwise. The degree of rotation of the controller required until the activator ceases to press upon the contact 62 and close the contacts 62, 63 corresponds to the minimum required length of safety belt which must be protracted to indicate that the safety belt probably is being used. The length of the activator 60 is designed to cover the minimum required protraction of the safety belt through complete retraction so that until the belt has been protracted at least the minimum required amount the indicator properly shows this fact.

The rear wall 50 of the housing 48 is formed with a U-shaped slot 69 thus forming a canterlevered retainer 70. This retainer is provided with a detent 72 aligned with the receptacles 46 of the controller 42. The cantilever support for the retainer provides a resilience biasing the detent 72 in a direction toward the controller 42. The shape and size of the detent are such as to permit the detent to mate with the receptacle 46 and the resilience is selected so as to provide a sufficient frictional resistance to avoid rotation of the controller 42 during the time that the driving arm 40 of the crank 30 is not engaged within a receptacle 48. However, the resilience also is small enough so that when the controller 42 is intentionally rotated, such as by rotation of the crank 30, the retainer will ride up onto the gear teeth 44 causing the detent 72 to become disengaged with the receptacle until the next succeeding receptacle 46 is aligned therewith at which time the retainer 70 forces the detent 72 into that receptacle.

SWITCH ADJUSTMENT (FIG. 6)

When an automatic safety belt retractor 12 is mounted in an automobile the switch 10 may be adjusted as follows. The tool 74 is inserted through the aperture 80 in the cover 52 such that the tooth 77 fits within the slot 79 in the driving arm 40 and the arcuate projection rests against the outer surface of the crank 30. The tool is forced inwardly depressing the crank toward the retractor 12 and terminating the driving engagement between the crank 30 and the shaft 28. The safety belt is protracted the minimum predetermined distance (for example, the distance set forth in the Federal Motor Vehicle Safety Standards) and is held in its protracted position while the crank 30 is manually rotated until the activator 60 permits the contacts 62, 63 to open. The crank is then released and the spring 38 forces the crank into driving engagement with the shaft 28. The safety belt is released and the automatic retractor returns the safety belt to its normal retracted position and, at the same time, the controller 42 rotates clockwise placing the activator 60 in its contact closing position. The reel switch is now set for use in that particular application.

ADJUSTMENT TOOL (FIG. 5)

As is explained above, it is preferred that adjustment of the switch be performed only upon installation of the switch and, therefore, by the manufacturer or automobile dealer. To discourage adjustment by others, the switch is designed to be adjusted by manual rotation of the crank by means of a special tool 74, such as the one illustrated in FIG. 5. The tool includes a shank 75 and a head 76, the head having a projecting narrow tooth 77 and an arcuate projection 78 diametrically opposed from the tooth 77. The tooth is designed to be received by a slot 79 formed in the outwardly facing surface of the crank driving arm 40 and the arcuate projection 78 is designed to press on the outwardly facing surface of the crank 30 diametrically opposed from the driving arm 40. A circular aperture 80 is provided through the switch housing cover 52 coaxial with the crank 30 in order to provide access to the crank for the tool 74.

SWITCH ADJUSTMENT (FIG. 6)

When an automatic safety belt retractor 12 is mounted in an automobile the switch 10 may be adjusted as follows. The tool 74 is inserted through the aperture 80 in the cover 52 such that the tooth 77 fits within the slot 79 in the driving arm 40 and the arcuate projection rests against the outer surface of the crank 30. The tool is forced inwardly depressing the crank toward the retractor 12 and terminating the driving engagement between the crank 30 and the shaft 28. The safety belt is protracted the minimum predetermined distance (for example, the distance set forth in the Federal Motor Vehicle Safety Standards) and is held in its protracted position while the crank 30 is manually rotated until the activator 60 permits the contacts 62, 63 to open. The crank is then released and the spring 38 forces the crank into driving engagement with the shaft 28. The safety belt is released and the automatic retractor returns the safety belt to its normal retracted position and, at the same time, the controller 42 rotates clockwise placing the activator 60 in its contact closing position. The reel switch is now set for use in that particular application.

SECOND EMBODIMENT (FIGS. 7 & 8)

One of the objectives of the first embodiment described above is to require the use of a special tool in order to adjust the retractor switch. An alternative objective is to provide a switch that may be adjusted with the use of a conventional tool, such as a screwdriver. The retractor switch 100 described below and illustrated in FIGS. 7 and 8 may be adjusted with a conventional screwdriver and is less expensive than the switch of the first embodiment due to the elimination of the clutch mechanism.

The switch 100 is conceptually the same as the switch 10 of the first embodiment in that it employs an internal gear controller 102 driven by a crank 104 which is drivingly connected to the shaft 105 of a retractor spool 106. The internal gear controller 102 is provided with an actuator 107 on its outer periphery which serves to close activator contacts 108, 110 which form part of an indicator signal circuit. The switch is enclosed within a housing 114 formed of a rear plate 116 and a cover 118 snap fitted onto the rear plate 116 and fixedly secured to the housing of the retractor. The cover is provided with a circular aperture 120 to accommodate the tool, such as a screwdriver, for adjusting the switch 100.

The crank 104, which may be of plastic such as a polyoxymethylene polymer (for example Delrin by E.I. Du Pont de Nemours & Co.) and injection molded is formed with an octagonal shank 122 and a cylindrical head 124. A driving arm or lug 126 is formed on the outer periphery of the head and is sized to mate with the tooth space of the internal gear controller 102. The outer face 128 of the head is provided with a slot 130 to receive a conventional screwdriver.

The shank 122 of the crank 104 is forcibly inserted within a cylindrical recess 132 formed in one end of the spool shaft 105, the spool shaft being fabricated of steel. The opposite end of the shaft 105 is formed as a bolt head 136 having a slot 138 to receive one end of a spring (not shown) for the retractor 12.

In order to adjust the switch 100, the safety belt is protracted the minimum predetermined distance indicating probable usage and the spool or webbing, or both, are held firmly. A screwdriver or similar tool is inserted in the slot 130 formed in the outer face of the crank 104. The crank is then forcibly rotated with respect to the spool shaft 105. As the crank is forcibly rotated with respect to the shaft 105, the controller 102 rotates adjusting the relative position between the actuator 107 and the contacts 108, 110 in the same manner as was described in detail above with respect to the first embodiment. Because of the interference fit between the crank shank 122 and the spool shaft 105 considerable force must be applied to cause the relative rotation; however, since the switch adjustment need only be made once, the seemingly potential problem of wear on the outer surface of the crank shank 122 is inconsequential.

THIRD EMBODIMENT (FIGS. 9 & 10)

In the first two embodiments described above the controllers (42, 102) were formed as internal gears and were driven by a single toothed crank (30, 104 respectively). In those configurations there is a substantial period of time during which the crank is not physically engaged with the controller. During that time the controller is prevented from rotating by the retainer 70. In this embodiment the crank always is in engagement with the controller, thus obviating the need for a retainer.

More specifically, the switch 200 of this third embodiment includes a crank 202 in the form of a spiral pinion which is fixedly attached to the spool of a retractor 204 by any suitable means. For example, a shaft 206 on the spiral pinion 202 can be force fitted into a recess in one end of the spool (not shown).

The spiral pinion 202 drivingly engages a ring gear controller 208. The controller 208 is located eccentric to the spiral pinion 202. The spiral extends more than 360° so that the pinion always is in engagement with the controller. The particular design illustrated in FIG. 9 provides a 14 to 1 gear ratio. The ring gear controller 208 is mounted on a hub 209 tilted at an angle, such as 10°, with respect to the spiral pinion 202 to allow the teeth 210 of the ring gear to escape under the non-driving side of the spiral pinion 202.

The controller 208 is provided with an actuator 212 on its outer periphery which serves to close activator contacts 214, 216, which are spring biased toward an open position. The contacts form part of an indicator signal circuit 218. The crank 202, controller 208 and contacts 214, 216 are enclosed within a housing 220, which is fixedly secured to the housing 222 of the retractor, such as by rivet 224.

When the vehicle passenger extends his lap safety belt the reel rotates causing the spiral pinion 202 to rotate. The spiral pinion, which is in constant engagement with the controller 208, causes the controller to rotate thereby moving the actuator 212 with respect to the contacts 214, 216. After the controller has rotated more than a predetermined amount, which amount reflects extension of the safety belt more than the minimum required amount, the actuator moves beyond the contact 214 allowing it to spring open and thereby breaking the circuit 218 so that the signals, such as a light 224 and alarm, are turned off.

In order for the signal to be silenced at the proper extent of protraction of the safety belt the controller 208 and actuator 212 must be properly aligned relative to the contacts 214, 216. This is accomplished easily by extending the belt the minimum required amount for the signals to be silenced and then placing the controller in contact with the pinion 202. The switch housing 220 is then fixed in place holding the controller and spiral pinion in engagement. The controller hub 209 rotates freely within the housing when driven by the pinion 202.

SUMMARY

It can be seen that the safety belt retractor switch of this invention may be inexpensively made and assembled with virtually all of the parts being injection molded out of plastic. The design permits the switch to be minimized in size — for example, the cover is intended to be approximately 1½ inches in diameter — and still be sturdy enough to withstand the daily uses that the switch will receive. Furthermore the switch permits adjustment of the actuation point without requiring adjustment or modification of the conventional safety belt retractor reels to which it is attached.

What is claimed as new and desired to be secured by Letters Patent of the United States is:

1. In a vehicle having a safety belt and safety belt retractor, the retractor having a rotatable spool on which the safety belt is wrapped when retracted and from which the belt extends when protracted, the improvement in a switch to signal whether or not the seat belt has been protracted adequately comprising:
    a rotatably mounted driving crank coupled to the retractor spool to rotate simultaneously with and in direct proportion to said spool,
    rotatably mounted driven means coupled to said crank and mounted eccentric to said crank, said driven means rotating a predetermined fractional portion of a complete rotation for each complete rotation of said crank,
    a switch having a normal first state and a second state, and
    an actuator connected to said driven means to rotate with said driven means, said actuator having a first predetermined position when the seat belt is fully retracted on said spool, said actuator being positioned to change the state of said switch from said first state to said second state when said actuator is carried by said driven means to a second predetermined position, the actuation of said switch by said actuator being solely a funtion of the number of turns of said spool.

2. The improvement of claim 1 wherein:
    said crank includes a single driving tooth,
    said driven means comprises a rotatable gear having internal teeth, said driving tooth of said crank engaging said internal teeth.

3. The improvement of claim 2 further comprising: a clutch connected between said crank and said spool, said crank being disengagable from said clutch, said crank when disengaged from said clutch and rotated causing said rotatable gear to rotate and to change said first predetermined position of said actuator.

4. The improvement of claim 1 wherein:
    said crank comprises a rotatable spiral pinion extending more than 360°, and
    said driven means comprises a rotatable ring gear having a set of teeth in continuous engagement with said pinion.

* * * * *

UNITED STATES PATENT OFFICE
CERTIFICATE OF CORRECTION

Patent No. 3,806,678  Dated April 23, 1974

Inventor(s) Rudi Franz Quinting & James A. Gavagan

It is certified that error appears in the above-identified patent and that said Letters Patent are hereby corrected as shown below:

Col. 1, line 24   after "reel switch" insert --which--

Col. 5, beginning line 14, "SWITCH ADJUSTMENT...........
through line 36    ...ticular application." delete entire paragraph including the heading.

Signed and Sealed this twenty-sixth Day of August 1975

[SEAL]

Attest:

RUTH C. MASON
*Attesting Officer*

C. MARSHALL DANN
*Commissioner of Patents and Trademarks*